(12) United States Patent
Kiss

(10) Patent No.: US 8,681,751 B2
(45) Date of Patent: Mar. 25, 2014

(54) METHOD AND APPARATUS FOR PROVIDING PRESENCE INFORMATION IN SUPPORT OF WIRELESS COMMUNICATION SERVICES

(75) Inventor: Krisztian Kiss, Del Mar, CA (US)

(73) Assignee: Nokia Corporation, Espoo (FI)

( * ) Notice: Subject to any disclaimer, the term of this patent is extended or adjusted under 35 U.S.C. 154(b) by 1725 days.

(21) Appl. No.: 11/348,896

(22) Filed: Feb. 7, 2006

(65) Prior Publication Data

US 2007/0010275 A1    Jan. 11, 2007

Related U.S. Application Data

(60) Provisional application No. 60/698,192, filed on Jul. 11, 2005.

(51) Int. Cl.
*H04W 4/00* (2009.01)

(52) U.S. Cl.
USPC ............ 370/338; 370/328; 370/260; 455/518

(58) Field of Classification Search
USPC .......................... 370/338, 328, 260; 455/518
See application file for complete search history.

(56) References Cited

U.S. PATENT DOCUMENTS

| | | |
|---|---|---|
| 2002/0116336 A1 | 8/2002 | Diacakis et al. |
| 2004/0005904 A1* | 1/2004 | Wolf et al. .................... 455/519 |
| 2005/0097473 A1 | 5/2005 | Malik et al. |
| 2005/0136952 A1 | 6/2005 | Zabawskyj et al. |
| 2005/0192039 A1* | 9/2005 | Xue et al. ....................... 455/517 |
| 2005/0272454 A1 | 12/2005 | Hiller et al. |
| 2006/0120308 A1* | 6/2006 | Forbes et al. .................. 370/260 |
| 2006/0229094 A1* | 10/2006 | Huh et al. ....................... 455/518 |
| 2006/0286993 A1* | 12/2006 | Xie et al. ....................... 455/518 |
| 2008/0040728 A1* | 2/2008 | Agrawal ........................ 719/313 |
| 2008/0268792 A1* | 10/2008 | Munje .......................... 455/90.2 |

FOREIGN PATENT DOCUMENTS

| | | |
|---|---|---|
| CN | 1708148 A | 12/2005 |
| EP | 1551163 A2 | 7/2005 |
| JP | 2003-303170 | 10/2003 |
| JP | 2004-328156 | 11/2004 |
| JP | 2005-217584 | 8/2005 |
| RU | 2 384 004 C2 | 3/2010 |
| WO | WO 03/069364 A2 | 8/2003 |
| WO | WO 03/105503 A1 | 12/2003 |
| WO | WO 2004/075001 A2 | 9/2004 |
| WO | WO 2004/075001 A3 | 9/2004 |
| WO | WO 2004/114643 A1 | 12/2004 |
| WO | WO-2007/007170 A2 | 1/2007 |

OTHER PUBLICATIONS

Bertenyi, B.: 3rd Generation Partnership project, Technical Specification Group Services and System Aspects; Presence service; Architecture and functional description; Stage 2-3GPP TR 23.141 Version 6.8.0, pp. 1-36 (Jun. 2005).

(Continued)

*Primary Examiner* — Barry Taylor

(74) *Attorney, Agent, or Firm* — Harrington & Smith

(57) ABSTRACT

An approach is provided for determining presence of a terminal within a communication network. An event affecting availability of a terminal over a communication network is determined. A message including information on the event is generated, wherein the message is used to provide presence information regarding the terminal.

36 Claims, 9 Drawing Sheets

(56) References Cited

OTHER PUBLICATIONS

Day, M., Rosenberg, J., Sugano, H.: A Model for Presence and Instant Messaging, pp. 1-15 (2000).
International Search Report and Written Opinion, PCT/IB2006/001915, Jan. 15, 2007, pp. 1-17.
Presence Simple Specification, Candidate Version 1.0—Jun. 28, 2005; Open Mobile alliance, OMA-TS-Presence_SIMPLE-V1_0-20050628-C, pp. 1-100 (2005).
Rosenberg, J.: A Session Initiation Protocol (SIP) Event Package for Registrations, pp. 1-22 (2004).
Russian Office Action for corresponding RU ApplicationNo. 2008100148/09(000167), Apr. 28, 2009, Russia.
Sultana, S.: 3rd Generation Partnership Project; Technical Specification Group Services and System Aspects; 3GPP enablers for Open Mobile Alliance (OMA) Push-to-talk over Cellular (PoC) services; Stage 2-3GPP TR 23.979 Version 6.2.0, pp. 1-38 (Jun. 2005).
Austrian Written Opinion for corresponding AT Application No. 200800268-5, Oct. 6, 2009, Austria.
Korean Office Action for corresponding KR Application No. 10-2008-7003214, Nov. 21, 2009, Korea.
Indonesian Office Action for corresponding IN Application No. W-00200800123 dated Feb. 22, 2010, Indonesia, 5 pages.
Korean Office Action for corresponding KR Application No. 10-2008-7003214, Jun. 30, 2010, Korea, pp. 1-9.
Mexican Office action for corresponding MX App. No. MX/a/2008/000568 dated May 17, 2010, pp. 1-4.
Chinese Office Action for corresponding CN application No. 2006800253719 dated Apr. 14, 2011, pp. 1-7.
Extended European Search Report for corresponding EP Application No. 06795099.8 dated Mar. 23, 2011, pp. 1-6.
Japanese Office action for corresponding JP app. No. 2008-520977 dated Aug. 3, 2010, pp. 1-19.
Chinese office action for corresponding CN application No. 200680025371.9 dated Nov. 9, 2010, pp. 1-12.

* cited by examiner

METHOD AND APPARATUS FOR PROVIDING PRESENCE INFORMATION IN SUPPORT OF WIRELESS COMMUNICATION SERVICES

RELATED APPLICATIONS

This application claims the benefit of the earlier filing date under 35 U.S.C. §119(e) of U.S. Provisional Application Ser. No. 60/698,192 filed Jul. 11, 2005, entitled "Method and Apparatus For Providing Presence Information In Support Of Wireless Communication Services," the entirety of which is incorporated by reference.

FIELD OF THE INVENTION

The invention relates to communications, and more particularly, to providing presence information within a radio communication system.

BACKGROUND OF THE INVENTION

Radio communication systems, such as cellular systems (e.g., spread spectrum systems such as Code Division Multiple Access (CDMA) networks), or Time Division Multiple Access (TDMA) networks), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of service has received significant attention, that of Push-to-Talk over Cellular (PoC). Traditional approaches have not provided for adequate indication of a user's availability within the network.

Push-To-Talk Over Cellular (PoC) service is a two-way form of communications that allows users to engage in immediate communication with one or more users. PoC service is similar to a "walkie-talkie" application in that by pressing a button, a talk session with an individual user or broadcast group is initiated. Receiving participants hear the sender's voice either without any action on their part (auto-answer mode), or may be notified and have to accept the call (manual-answer mode) before listening to the sender's voice. Because of the "immediate" nature of this type of communication, determining presence of the user is imperative.

Therefore, there is a need for an approach for more effectively determining availability or presence information of a mobile station or user within a radio communication system.

SUMMARY OF THE INVENTION

These and other needs are addressed by the invention, in which an approach is presented for more effectively determining presence of users in a communication network.

According to one aspect of an embodiment of the invention, a method comprises determining an event affecting availability of a terminal over a communication network. The method also comprises generating a message including information on the event, wherein the message is used to provide presence information regarding the terminal.

According to another aspect of an embodiment of the invention, an apparatus comprises a processor configured to determine an event affecting availability of a terminal over a communication network, and to generate a message including information on the event. The message is used to provide presence information regarding the terminal.

According to another aspect of an embodiment of the invention, a method comprises registering with a communication network to communicate over the communication network. An event associated with the registration is used to determine availability for a communication service supported by the communication network. An application server generates a message including information on the event. The message is used to provide presence information relating to the communication service.

According to yet another aspect of an embodiment of the invention, an apparatus comprises a processor configured to initiate registration with a communication network to communicate over the communication network. An event associated with the registration is used to determine availability for a communication service supported by the communication network. An application server generates a message including information on the event. The message is used to provide presence information relating to the communication service.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF THE PREFERRED EMBODIMENT

An apparatus, method, and software for providing presence information attributes in a radio communication system are described. In the following description, for the purposes of explanation, numerous specific details are set forth in order to provide a thorough understanding of the invention. It is apparent, however, to one skilled in the art that the invention may be practiced without these specific details or with an equivalent arrangement. In other instances, well-known structures and devices are shown in block diagram form in order to avoid unnecessarily obscuring the invention.

Although the various embodiments of the invention are described with respect to a Push-To-Talk Over Cellular (PoC) service with a spread spectrum cellular network, it is recognized and contemplated that the invention has applicability to other group communication services and radio networks. Additionally, although the invention is discussed with respect to IMS (IP Multimedia Subsystem Service) and MMD (Multimedia Domain) networks, it is recognized by one of ordinary skill in the art that the invention has applicability to any type of IP based core networks utilizing other communication protocols. Also, it is contemplated that any type of session establishment protocol, Internet Engineering Task Force (IETF) Session Initiation Protocol (SIP) or International Telecommunication Union (ITU) H.323 protocol, can be utilized to practice the various embodiments of the invention.

Further, the approach, according to various exemplary embodiments, describes methods for dissemination of presence information attributes over the 3GPP ($3^{rd}$ Generation Partnership Project) IMS (IP Multimedia Subsystem) and 3GPP2 ($3^{rd}$ Generation Partnership Project2) MMD (Multimedia Domain) networks. IMS provides IP Multimedia services, including PoC, VoIP (Voice over Internet Protocol) or packetized voice calls, instant messaging (IM), presence, group communications, etc. to mobile devices. IMS utilizes, for example, the Session Initiation Protocol (SIP) as the signaling protocol, which is more fully described in Internet Engineering Task Force (IETF) Request for Comment (RFC) 3261 (which is incorporated herein by reference in its entirety).

Figure 1:
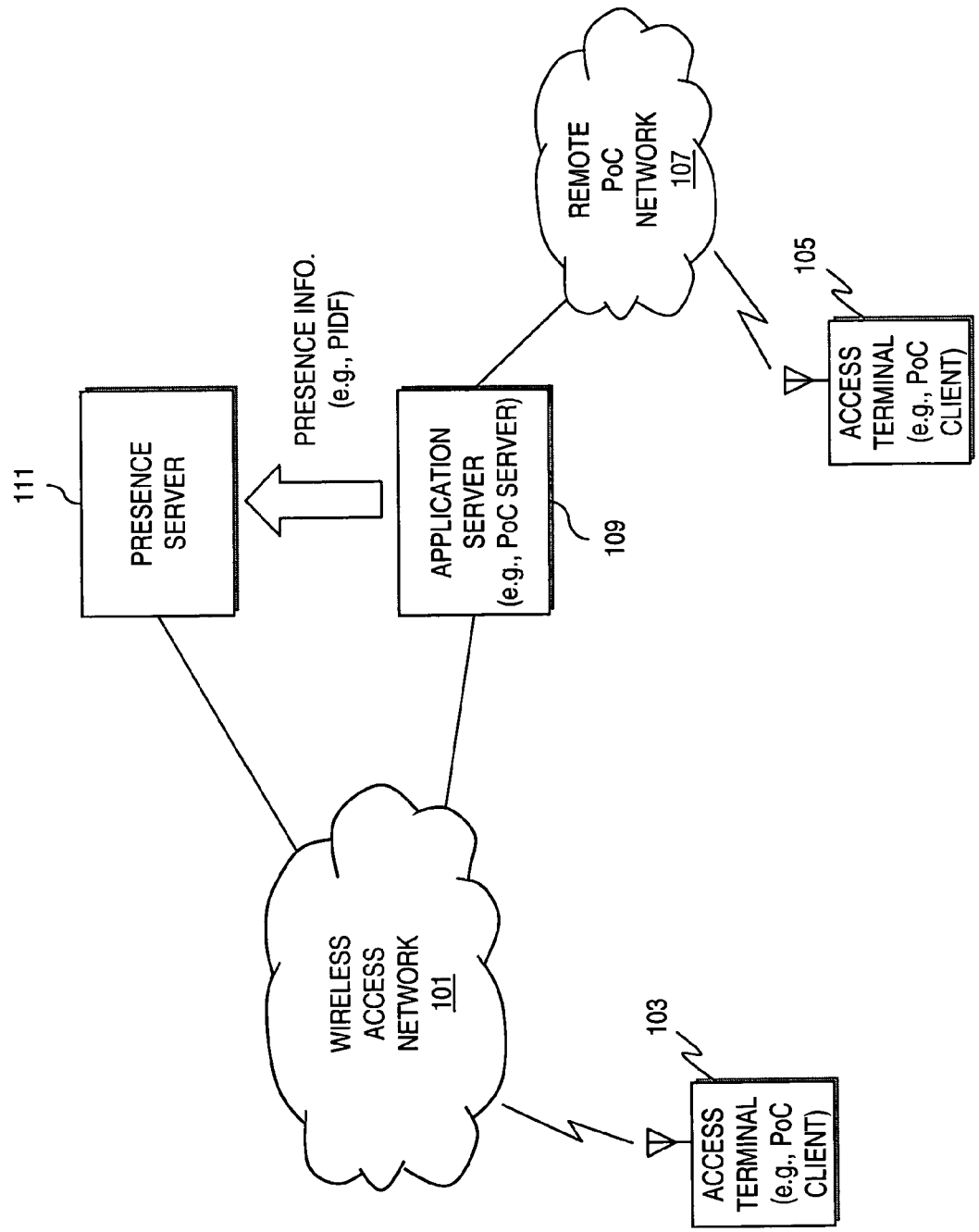
FIG. 1 is a diagram of a radio communication system for supporting extended presence information attributes, in accordance with an embodiment of the invention.

FIG. 1 is a diagram of a radio communication system for supporting extended presence information attributes, in accordance with an embodiment of the invention. A wireless access network 101 provides communication services for access terminals 103, 105. In an exemplary embodiment, the wireless access network 101 supports a group communication service—e.g, Push-To-Talk Over Cellular (PoC) service; as such, the terminals 103, 105 are configured as PoC clients (i.e., PoC terminal). For the purposes of illustration, the PoC terminal 105 is served by a remote PoC network 107.

An important aspect of the PoC service is determining presence (and thus, availability) of the terminals 103, 105. Presence availability is supported by a presence server 111, which is an entity that accepts, stores, and distributes presence information. The presence information, according to one embodiment, can be supplied by an application server 109 to a presence server 111 for publishing to the terminals 103, 105 (i.e., watchers).

Each of the PoC terminals 103, 105 can support such hardware capabilities as a speakerphone and/or headset as well as software that provides the capability for the user to configure the PoC terminal 103, 105 to accept session initiations immediately and play out the media as soon as it is received without requiring the intervention of the called user. This mode of operation is known as auto-answer mode or automatic mode. The user may alternatively configure the PoC terminal 103, 105 to first alert the user and require the user to manually accept the session invitation before media is accepted. This mode of operation is known as manual-answer mode. The PoC terminal 103, 105 may support both or only one of these modes of operation. For example, the user can readily change the Answer Mode (AM) configuration of the PoC terminal 103, 105 based on current circumstances and preference (e.g., the user is now busy or has moved to a public area, such that use of a speaker phone is not appropriate).

Each of the PoC terminals 103, 105 can also be configured as a Session Initiation Protocol (SIP) user agent (UA). As a SIP UA, the PoC terminal 103, 105 can establish a session to one or more SIP UAs simultaneously; this communication can be initiated by the user by pushing a "talk" button. SIP PoC terminals 103, 105 can support various SIP-based communication services in addition to Push-To-Talk (e.g., VoIP telephony, presence services, messaging services, etc.). The user may at times want to disable the acceptance of Push-To-Talk sessions, while remaining SIP registered for one or more other SIP based services. When the PoC terminal is configured to not accept any incoming Push-To-Talk sessions, this configuration is referred to as Incoming Session Barring (ISB).

Additionally, the user may wish to contact a user who has a PoC terminal with the Incoming Session Barring enabled. In this scenario, the user can send an Instant Personal Alert to this other user to indicate that a PoC Session is sought. This Instant Personal Alert is received even when the destination PoC terminal has enabled Incoming Session Barring. If a user wants to disable the acceptance of Instant Personal Alerts, the user can configure the PoC terminal not to accept any incoming Instant Personal Alerts; this is known as Instant Personal Alert Barring (IAB).

To provide the user with a satisfactory communications experience, the initial session establishment delay, from the time the user presses the button to the time the user receives an indication to speak, must be minimized. A contributing factor to this delay is determining presence of the target user.

The Open Mobile Alliance (OMA) has defined a collection of requirements in support of the PoC service. In particular, the "OMA (Open Mobile Alliance) Presence SIMPLE enabler" defines the Presence Information Element called "Application-specific Availability." This element indicates whether it is possible to receive an incoming communication request using the specified service and device (if that is specified). For example, if a presentity (e.g., terminal 103) is provisioned with the PoC service and satisfies one or more conditions (e.g., being within coverage of the network 101, and being an appropriate handset (in terms of hardware and/or software configurations), etc.), the user would be "available" for the PoC service. However, if any of those conditions were not true, the user would be "unavailable."

The "OMA Presence SIMPLE enabler" also defines that the "Application-specific Availability" is to be mapped to a Presence Information Data Format (PIDF) data format using the following scheme: <tuple>→<status>→<basic>→open/closed and <service-description>. However, it is recognized that such a scheme is unduly restrictive. That is, using the binary <basic> "open" and "closed" values for availability, the watcher's knowledge is limited with respect to what can be expected for the future value of the availability.

In case of the OMA PoC service, the availability of the user is set to "closed" when the user deregisters from the network, but it is also set to "closed" when the user turns on the Incoming Session Barring (ISB) flag (or indicator). These two cases represent different user behaviors, but, with the OMA model there is no way to differentiate between these different cases. While the user is unregistered, the watcher can expect that the PoC user may not be available anytime soon (e.g., the user may be on vacation and the device is turned off). However, when the ISB flag is set, the watcher can expect that the PoC user's unavailability is only temporary. In other words, the user will be available relatively soon (e.g., the user may be in an important meeting, and therefore, has turned on the ISB since the user does not want to be disturbed/interrupted by anyone).

The approach, according to one embodiment of the invention, extends basic, binary type of availability with registration-state, barring-state and session-participation information indicating further details of the availability information. In an exemplary embodiment, this information can be derived from the Session Initiation Protocol (SIP) registration state event package. As explained earlier, the terminals 103, 105 can employ SIP to establish and tear-down communications sessions between them. An important function of SIP is the registration operation, which provides the binding between a SIP Uniform Resource Identifier (URI) (i.e., an address-of-record) and one or more contact URIs. The SIP REGISTER method permits a user agent to manipulate registrations; for example, contacts can be added or removed, and policies can be implemented to prevent unauthorized access. Under the SIP protocol, registrations expire after a certain period, and thus, require refreshing to be in effect.

Figure 2:
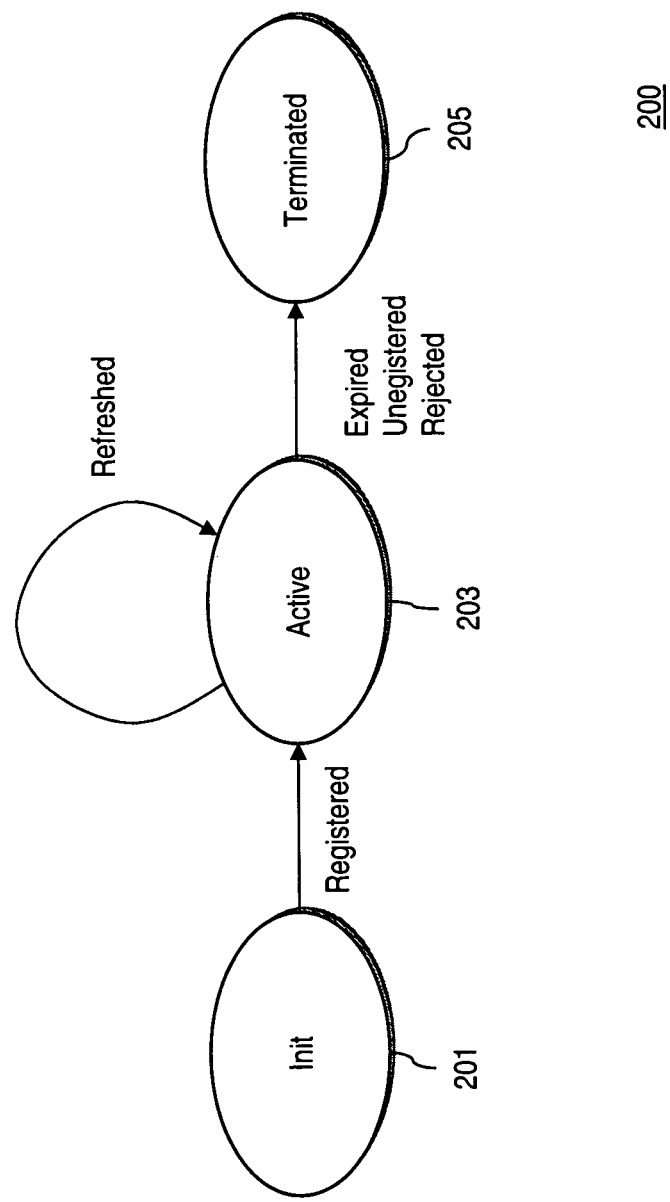
FIG. 2 is a diagram of a registration procedure for the terminals in the system of FIG. 1.

FIG. 2 is a diagram of a registration procedure for the terminals in the system of FIG. 1. The registration state event package is detailed in IETF RFC 3680, entitled "A Session Initiation Protocol (SIP) Event Package for Registration," which is incorporated herein by reference in its entirety. RFC 3680 defines the following event states: Init ("Initial") state 201, an Active state 203, and a Terminated state 205. However, only Active state and Terminated state are useful for determining presence availability. The finite state machine 200 for the registration procedure is illustrated with the events that are pertinent to providing presence information. This finite state machine 200 represents a per-contact state machine, such that the machine is instantiated when the contact is registered, and deleted when upon removal of the contact. When there are no contacts registered to the address-of-record, the state machine is in the Init state. When a contact registers to the address-of-record, the state machine 200 transitions from the Init state 201 to the Active state 203. That is, when a new contact is added, the finite state machine for it is instantiated, and transitions into the Active state 203. The state machine 200 remains in the Active state 203 if there is at least one contact bound to the address-of-record. When the last contact expires or is removed, the registration transitions to the Terminated state 205.

According to an embodiment of the invention, the application server 109 (of FIG. 1) can be a subscriber to the registration event package. A notification is generated to the subscribers when any event occurs in either the address-of-record or per-contact state machines. The events of interest include registered, refreshed, expired, unregistered and rejected. Certain registration states, e.g., Active state 203, and a Terminated state 205, can be mapped to presence information.

Further, for OMA PoC service, additional availability information are defined to represent the following state information: ISB (Incoming Session Barring), IAB (Instant Personal Alert Barring), and the maximum number of allowed simultaneous (or concurrent) PoC sessions has been reached.

Figure 3B:
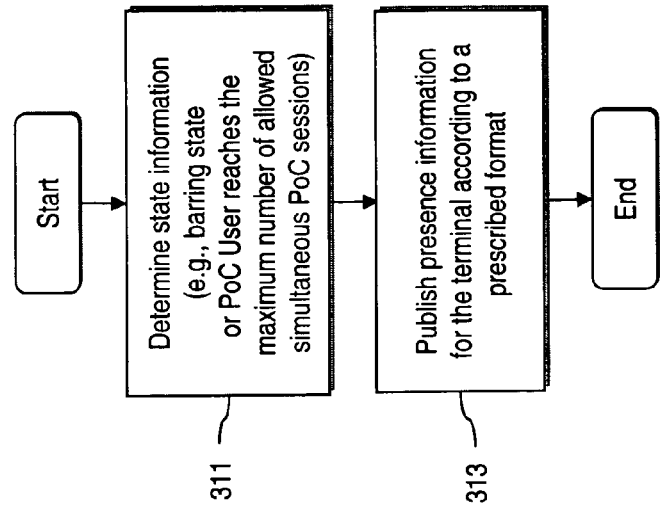
FIGS. 3A and 3B are flowcharts of processes for providing extended presence information, in accordance with an embodiment of the invention.
Figure 3A:
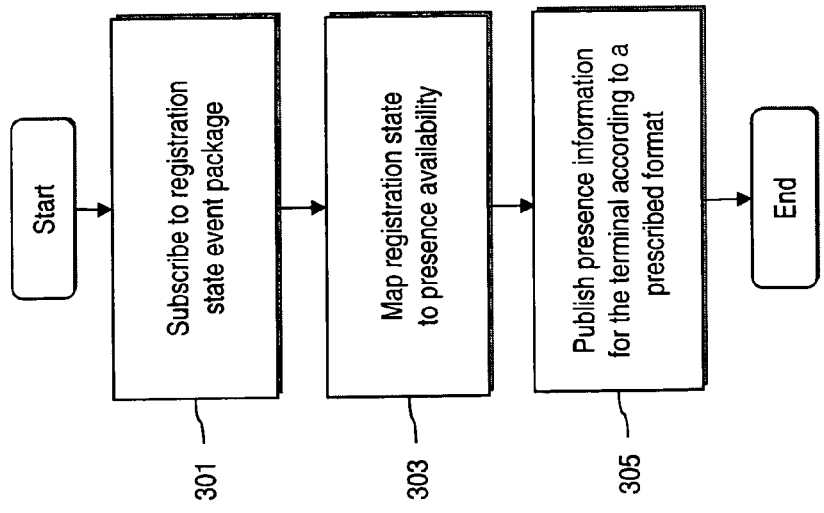

FIGS. 3A and 3B are flowcharts of processes for providing extended presence information, in accordance with an embodiment of the invention. According to one embodiment of the invention, the application server 109 can follow the IP Multimedia Subsystem (IMS) architecture. The interaction between the application server 109 (e.g., PoC server) and the presence server 111 in providing presence information is explained as follows.

In step 301, the application server 109 can subscribe for a registration state event package, as to receive updates of event (or state) changes. It is recognized that the registration state could be viewed as one kind of presence information, but it is not directly usable for presence, as the presence server 111 expects all publications to be provided in a strict, prescribed format—e.g., Presence Information Data Format (PIDF). The procedures on how an application server subscribes to the registration state event package is detailed in 3GPP TS 34.229 and 3GPP2 X.S0013-004-A, which are incorporated herein by reference in their entireties.

According to an embodiment of the invention, the application server 109 utilizes the registration state (e.g., as defined in RFC 3680) as input to presence information. In other words, the registration state is mapped to presence availability (per step 303), thereby providing an additional value to availability. Next, the presence information is published according to the prescribed format, as in step 305.

Alternatively, the application server 109 itself may have the knowledge of the state information (a scenario described in FIG. 3B). For instance, assuming the application server 109 is a PoC server, the ISB or IAB indicators can be set directly on the PoC server 109 using a PoC settings event package. Under this scenario, the barring state, i.e. the state of the ISB or IAB indicators, as set by the mobile terminal 103, is determined (step 311). In another instance, assuming the application server 109 is a PoC server, the PoC Server determines if the PoC User reaches the maximum number of allowed simultaneous PoC sessions (step 311).

When the application server 109 knows the state information, the application server 109 can directly map the attribute to the appropriate presence format and publish the attribute as presence information (as extension of availability), per step 313.

In accordance with an embodiment of the invention, the presence server 111 utilizes the Presence Information Data Format (PIDF) to collect presence information. The PIDF is defined in RFC 3863, entitled "Presence Information Data Format (PIDF)" (which is incorporated herein by reference in its entirety). Thus, the PIDF, in an exemplary embodiment, can be extended with registration state, barring state and session-participation information. The eXtensible Markup Language (XML) schema for this information can be defined as an extension to PIDF. In an exemplary embodiment, three extension values, <registration-state>, <barring-state> and <session-participation> can be specified.

Table 1 describes an exemplary XML (eXtensible Markup Language) schema definition:

TABLE 1

```
<?xml version="1.0" encoding="UTF-8"?>
    <xs:schema
        targetNamespace="urn:oma:params:xml:ns:pidf:oma-pres"
        xmlns:xs="http://www.w3.org/2001/XMLSchema"
        xmlns="urn:oma:params:xml:ns:pidf:oma-pres"
        elementFormDefault="qualified"
        attributeFormDefault="unqualified">
        <!-- This import brings in the XML language attribute xml:lang-->
        <xs:import namespace="http://www.w3.org/XML/1998/
            namespace" schemaLocation="http://www.w3.org/2001/
            xml.xsd"/>
        <xs:annotation>
            <xs:documentation xml:lang="en">
                XML Schema definition for OMA extensions to PIDF and
Presence Data Model
            </xs:documentation>
        </xs:annotation>
        <xs:element name="registration-state">
            <xs:simpleType>
```

TABLE 1-continued

```
            <xs:restriction base="xs:string">
                <xs:enumeration value="active"/>
                <xs:enumeration value="terminated"/>
            </xs:restriction>
        </xs:simpleType>
    </xs:element>
    <xs:element name="barring-state">
        <xs:simpleType>
            <xs:restriction base="xs:string">
                <xs:enumeration value="active"/>
                <xs:enumeration value="terminated"/>
            </xs:restriction>
        </xs:simpleType>
    </xs:element>
    <xs:element name="session-participation">
        <xs:complexType>
            <xs:sequence>
                <xs:element name="basic" type="basicType"
                    minOccurs="0"/>
                <xs:element name="max" type="emptyType"/>
                <xs:any namespace="##other" processContents="lax"
minOccurs="0" maxOccurs="unbounded"/>
            </xs:sequence>
        </xs:complexType>
    </xs:element>
    <xs:simpleType name="basicType">
        <xs:restriction base="xs:string">
            <xs:enumeration value="open"/>
            <xs:enumeration value="closed"/>
        </xs:restriction>
    </xs:simpleType>
    <xs:complexType name="emptyType"/>
</xs:schema>
```

In one example, the PoC user becomes unavailable due to unregistration: <registration-state>terminated</registration-state> is mapped from the registration state event package; <barring-state>terminated</barring-state> is mapped from the PoC settings event package. Table 2 shows the associated XML:

TABLE 2

```
<?xml version="1.0" encoding="UTF-8"?>
<presence xmlns="urn:ietf:params:xml:ns:pidf"
    xmlns:op="urn:oma:params:xml:ns:pidf:oma-pres"
    entity="sip:someone@example.com">
    <tuple id="a1231">
        <status>
            <basic>closed</basic>
        </status>
        <op:registration-state>terminated</op:registration-state>
        <op:barring-state>terminated</op:barring-state>
        <op:willingness>
            <op:basic>closed</op:basic>
        </op:willingness>
        <op:session-participation>
            <op:basic>closed</op:basic>
        </op:session-participation>
        <op:service-description>
            <op:service-id>org.openmobilealliance:PoC-Session</op:service-id>
            <op:version>1.0</op:version>
        </op:service-description>
        <contact>sip:my_name@example.com</contact>
        <timestamp>2005-02-22T20:07:07Z</timestamp>
    </tuple>
</presence>
```

In another example, the PoC-session service becomes unavailable due to the setting of the ISB flag: <registration-state>active</registration-state> is mapped from the registration state event package, <barring-state>active</barring-state> is mapped from PoC settings event package. Table 3 shows the associated XML:

TABLE 3

```
<?xml version="1.0" encoding="UTF-8"?>
<presence xmlns="urn:ietf:params:xml:ns:pidf"
    xmlns:op="urn:oma:params:xml:ns:pidf:oma-pres"
    entity="sip:someone@example.com">
    <tuple id="a1231">
        <status>
            <basic>closed</basic>
        </status>
        <op:registration-state>active</op:registration-state>
        <op:barring-state>active</op:barring-state>
        <op:willingness>
            <op:basic>closed</op:basic>
        </op:willingness>
        <op:session-participation>
            <op:basic>closed</op:basic>
        </op:session-participation>
        <op:service-description>
            <op:service-id>org.openmobilealliance:PoC-Session</op:service-id>
            <op:version>1.0</op:version>
        </op:service-description>
        <contact>sip:my_name@example.com</contact>
        <timestamp>2005-02-22T20:07:07Z</timestamp>
    </tuple>
</presence>
```

In another example, the PoC-session service becomes unavailable because the maximum number of allowed simultaneous PoC sessions has been reached: the PoC server 109 publishes the <session-participation> element to indicate so. Table 4 shows the associated XML:

TABLE 4

```
<?xml version="1.0" encoding="UTF-8"?>
<presence xmlns="urn:ietf:params:xml:ns:pidf"
    xmlns:op="urn:oma:params:xml:ns:pidf:oma-pres"
    entity="sip:someone@example.com">
    <tuple id="a1231">
        <status>
            <basic>closed</basic>
        </status>
        <op:registration-state>active</op:registration-state>
        <op:barring-state>terminated</op:barring-state>
        <op:willingness>
            <op:basic>closed</op:basic>
        </op:willingness>
        <op:session-participation>
            <op:basic>open</op:basic>
            <op:max/>
        </op:session-participation>
        <op:service-description>
            <op:service-id>org.openmobilealliance:PoC-Session</op:service-id>
            <op:version>1.0</op:version>
        </op:service-description>
        <contact>sip:my_name@example.com</contact>
        <timestamp>2005-02-22T20:07:07Z</timestamp>
    </tuple>
</presence>
```

In yet another scenario, the PoC-Alert Service is unavailable because the IAB flag is set to "on": <registration-state>active</registration-state> is mapped from the registration state event package, <barring-state>active</barring-state> is mapped from the PoC settings event package. Table 5 shows the associated XML:

TABLE 5

```
<?xml version="1.0" encoding="UTF-8"?>
<presence xmlns="urn:ietf:params:xml:ns:pidf"
    xmlns:op="urn:oma:params:xml:ns:pidf:oma-pres"
    entity="sip:someone@example.com">
```

TABLE 5-continued

```
<tuple id="a1231">
    <status>
        <basic>closed</basic>
    </status>
    <op:registration-state>active</op:registration-state>
    <op:barring-state>active</op:barring-state>
    <op:willingness>
        <op:basic>closed</op:basic>
    </op:willingness>
    <op:session-participation>
        <op:basic>closed</op:basic>
    </op:session-participation>
    <op:service-description>
        <op:service-id>org.openmobilealliance:PoC-Alert</op:service-id>
        <op:version>1.0</op:version>
    </op:service-description>
    <contact>sip:my_name@example.com</contact>
    <timestamp>2005-02-22T20:07:07Z</timestamp>
</tuple>
</presence>
```

Figure 4:
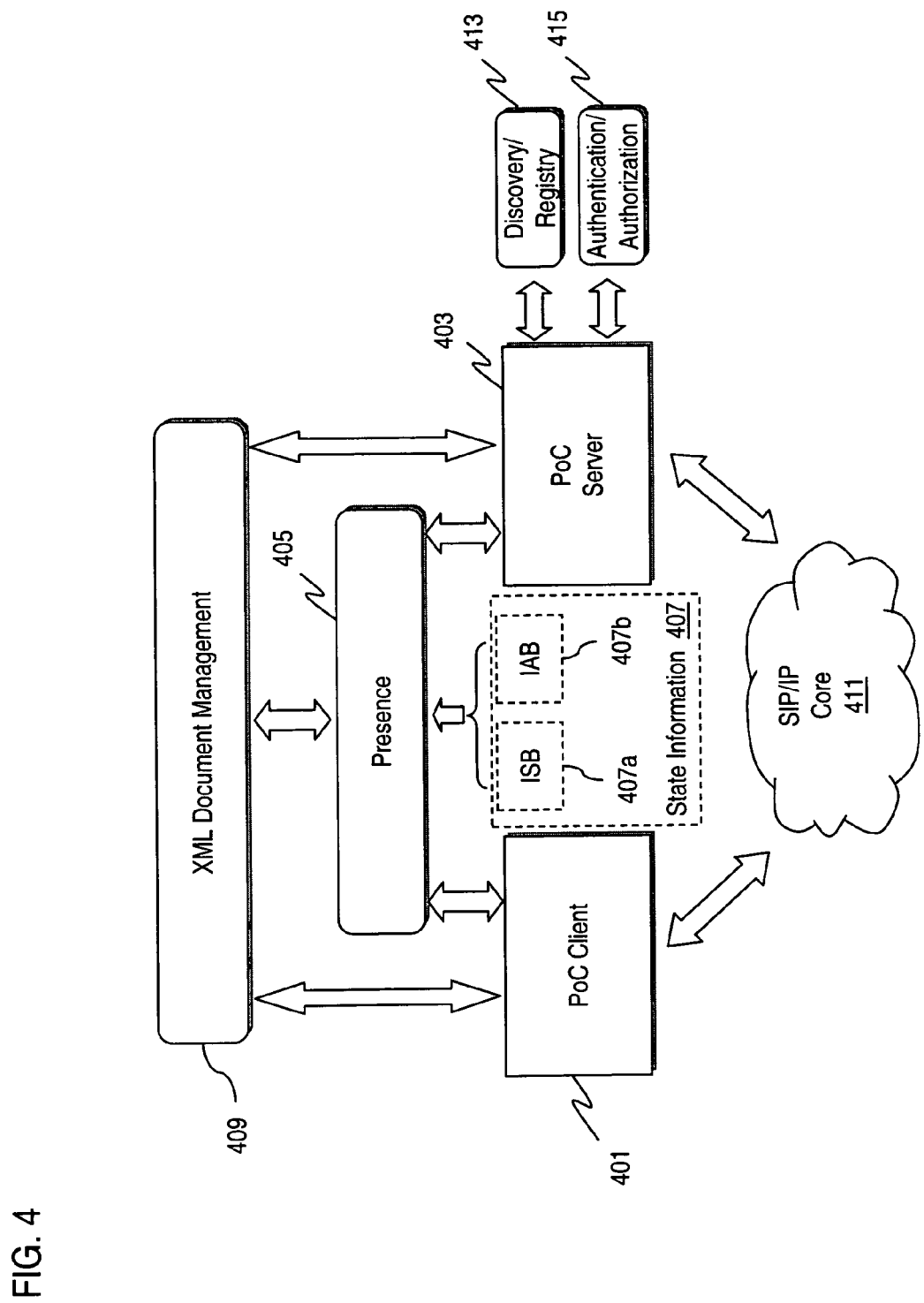
FIG. 4 is a diagram of an exemplary Push-to-Talk over Cellular (PoC) architecture capable of supporting presence service, in accordance with one embodiment of the invention.

FIG. 4 is a diagram of an exemplary Push-to-Talk over Cellular (PoC) architecture capable of supporting presence service, in accordance with one embodiment of the invention. To support the PoC service, a PoC client 401 and a PoC server 403 interface with a presence module 405 to ensure that presence information about the PoC client is known. The presence module 405 (which can be deployed as a presence server) is an entity that accepts, stores, and distributes presence information about PoC clients. The presence information may be published by the PoC server 403 on behalf of the PoC client 401. This information can be subscribed to by a watcher, or by the PoC server 403 on behalf of the PoC client 401. According to various embodiments of the invention, state information (e.g., registration state, barring state, session participation) are factored into determination of presence availability of the PoC client 401. As shown, for example the ISB flag 407a or the IAB flag 407b can be utilized to provide additional availability information.

The presence module 405 interacts with an XML Document Management (XDM) module 409, which manages XML documents stored in the network (e.g., PoC-specific documents, URI contact lists, etc.). Among other management functions, the XDM module 409 can subscribe to changes made to these XML documents, wherein notifications are received when document changes occur. The XDM module 409 can be implemented in a fixed terminal, or user equipment.

The capabilities of the PoC client 401 and the presence server 405 to support the PoC service are further explained as follows. The PoC client 401 can access the PoC service, and can reside within an access terminal (e.g., mobile), as illustrated in FIG. 1. The PoC client 401 is configured to provide PoC session initiation and release as well as perform registration with, for example, a SIP/IP core 411. The PoC client 401 can also perform user authentication to the SIP/IP core 411. Additionally, the PoC client 401 generates and exchanges talk bursts (i.e., PoC traffic) using associated procedures and protocols—e.g., talk burst control procedures; talk burst control protocol negotiation; capability to set the Answer Mode Indication (Manual Answer, Automatic Answer), Incoming Session Barring, and Incoming Instant Personal Alert Barring; simultaneous PoC Sessions support; and user plane adaptation procedures if initiated by the PoC server 403.

The PoC server 403 provides two major functions to enable the PoC service: a controlling PoC function, and a participating PoC function. The particular role (controlling or participating) for the PoC server 403 is determined during the PoC Session setup and remains set for the duration of the session. In a PoC Session, there is one PoC server 403 performing the controlling PoC function; however, there can be one or more PoC servers performing the participating PoC function in the PoC session.

As part of its responsibilities in performing the controlling function, the PoC server 403 can manage N number of SIP sessions and media and talk burst control communication paths in one PoC Session, where N is number of participants in the PoC session. In this role, the PoC server 403 can route media and media-related signaling, such as talk burst control messages, to the PoC client 401 via a PoC server that is performing the participating PoC functioning for a PoC client. In this example, it is assumed that the PoC server 403 is performing the controlling function, and another PoC server (not shown) assumes the participating function. The PoC server that is performing the participating PoC function can permit the PoC server 403 (performing the controlling PoC function) to have a direct communication path for media and media-related signaling to each PoC client 401. It is noted that the PoC server 403 has no direct communication with the PoC client 401 for PoC session signaling; however, the PoC server communicates with the PoC client 401 when performing the participating functioning for the PoC client 401.

Further, as mentioned, the PoC server 403 can assume the role of a watcher. In this capacity, the server 403 can request presence information from the presence service (e.g., presence module 405) in order to provide the mediation of presence attributes for PoC session policy enforcement (e.g., PoC client "not reachable" status, enforcing the PoC clients' PoC presence settings, etc.). It is noted that the PoC server 403 can support policy enforcement for PoC session handling based on PoC-related or general presence information.

As shown, a Discovery and Registry module 413 performs SIP registration to the SIP/IP Core 411, indicating the support of PoC service in the register request. After successful registration of the PoC user, communication can commence. Additionally, an authentication/authorization module 415 provides authentication of the PoC client 401 for access to the PoC service.

For the purposes of illustration, PoC specific presence information elements and presence procedures are described in the context of the OMA PoC service. A set of presence elements is specified to express the PoC user's Presence status. Table 6 enumerates the presence element mapping to the respective presence information elements.

TABLE 6

| PRESENCE ELEMENT | PRESENCE INFORMATION ELEMENTS | DESCRIPTION |
|---|---|---|
| Willingness for PoC Session Service | "Application-specific Willingness for PoC-session" | Indicates whether the PoC user is currently willing to accept new incoming PoC Sessions (Yes/No) |

TABLE 6-continued

| PRESENCE ELEMENT | PRESENCE INFORMATION ELEMENTS | DESCRIPTION |
|---|---|---|
| Willingness for PoC Alert Service | "Application-specific Willingness for PoC-alert" | Indicates whether the PoC user is currently willing to accept incoming Instant Personal Alerts (Yes/No) |
| Availability for PoC Session Service (Able to accept new incoming PoC Session) | "Application-specific Availability for PoC-session" | Indicates whether the PoC user is able to accept a new incoming PoC Session (True/False) |
| Availability for PoC Alert Service (Able to accept incoming Instant Personal Alerts) | "Application-specific Availability for PoC alert" | Indicates whether the PoC user is able to accept incoming Instant Personal Alerts (True/False) |
| PoC Session Participation (Currently in at least one PoC Session) | "Session Participation" | Indicates whether the PoC user is currently engaged in one or more PoC Sessions or the PoC User has reached his/her maximum number of simultaneous PoC sessions (True/False/Max) |

The "Availability for PoC Session Service" can be mapped to the "Application-specific Availability" presence information element pertaining to the "PoC-session" service, per Table 7:

TABLE 7

```
<tuple>  →<status>→<basic>→open/closed
         →<service-description>
             →<service-id>→org.openmobilealliance:PoC-session
             →<version>→1.0
         →<registration-state>→active/terminated
         →<barring-state>→active/terminated
```

The "Availability for PoC Session Service" presence information element can be mapped to the following: a mandatory <status> element with <basic> subelement with the value "open"; an optional <registration-state> element with the value "active"; and an optional <barring-state> element with the value "terminated."

The above mapping occurs if the presentity is available for incoming PoC Sessions. This occurs when the PoC user is registered, ISB is not activated and the maximum number of simultaneous PoC sessions is not reached.

Further, the "Availability for PoC Session Service" presence information element can be mapped to a mandatory <status> element with a <basic> subelement with the value "closed" and an optional <registration-state> element with the value "terminated"; or an optional <barring-state> element with the value "active"; or an optional <registration-state> element with the value "active" and an optional <barring-state> element with the value "terminated." Under this scenario, the presentity is unavailable for incoming PoC Sessions. This occurs when the PoC user is not registered; ISB is activated; or the maximum number of simultaneous PoC sessions is reached.

The "Availability for PoC Alert Service" can be mapped to the "Application-specific Availability" presence information element pertaining to a "PoC-alert" service, per Table 8:

TABLE 8

```
<tuple >  →<status>→<basic>→open/closed
          →<service-description>
              →<service-id>→org.openmobilealliance:PoC-alerts
```

TABLE 8-continued

```
              →<version>→1.0
          →<registration-state>active/terminated
          →<barring-state>→active/terminated
```

If the presentity is available for incoming PoC Instant Personal Alerts, the "Availability for PoC Alert Service" presence information element can be mapped to one of the following: a mandatory <status> element with a <basic> subelement with the value "open"; and an optional <registration-state> element with the value "active"; or an optional <barring-state> element with the value "terminated."

The above condition occurs when the PoC user is registered and Instant Personal Alerts Barring (IAB) is not activated.

However, if the presentity is unavailable for incoming PoC Instant Personal Alerts, the "Availability for PoC Alert Service" presence information element can be mapped to a mandatory <status> element with a <basic> subelement with the value "closed" and an optional <registration-state> element with the value "terminated"; or an optional <barring-state> element with the value "active." This scenario occurs when the PoC user is not registered or Instant Personal Alerts Barring (IAB) is activated.

The "PoC Session Participation" can be mapped to the "Session Participation" presence information element pertaining to a "PoC Session" service, per Table 9:

TABLE 9

```
<tuple >   →<session-participation>→<basic>→open/closed
                   →<max>
           →<service-description>
               →<service-id>→org.openmobilealliance:PoC-session
               →<version>→1.0
```

The "PoC Session Participation" presence information element can be mapped to a <session-participation> element with a <basic> subelement with the value "open" if the presentity is participating in at least one PoC Session, but the maximum number of allowed simultaneous PoC sessions has not been reached. The "PoC Session Participation" presence information element can be mapped to a <session-participation> element with a <basic> sub-element with the value "open" and a <max> sub-element if the presentity has reached the maximum number of allowed simultaneous PoC sessions.

Otherwise, the "PoC Session Participation" presence information element can be mapped to a <session-participation> element with a <basic> subelement with the value "closed" if the presentity is not participating in any PoC Session.

With respect to PoC server procedure, if the PoC server 403 performing the Participating PoC Function in, for example, the PoC user's Home PoC Network supports publishing Presence Information on behalf of the PoC client 401, the PoC server 403 can publish the presence information elements indicated in a 'PRES-SRV-CAP' provisioning parameter sent to the PoC client 401.

Table 10 defines the exemplary presence information elements that can by published by the PoC server 403.

TABLE 10

| POC PROCEDURE | PRESENCE INFORMATION ELEMENTS | PRESENCE INFORMATION ELEMENT VALUE |
|---|---|---|
| General Procedures | | |
| Registration | "Application-specific Availability for PoC-sessions" | basic: open (mandatory) registration-state: active (optional) barring-state: terminated (optional) |
| De-registration | "Application-specific Availability for PoC-alerts" | basic: open (mandatory) registration-state: active (optional) barring-state: terminated (optional) |
| | "Session Participation" | basic: closed (mandatory) |
| | "Application-specific Availability for PoC-sessions" | basic: closed (mandatory) registration-state: terminated (optional) barring-state: terminated (optional) |
| | "Application-specific Availability for PoC-alerts" | basic: closed (mandatory) registration-state: terminated (optional) barring-state: terminated (optional) |
| Setting: ISB: ON received | "Application-specific Availability for PoC-sessions" | basic: closed (mandatory) registration-state: active (optional) barring-state: active (optional) |
| Setting: ISB: OFF received | "Application-specific Availability for PoC-sessions" | basic: open (mandatory) registration-state: active (optional) barring-state: terminated (optional) |
| Setting: IAB: ON received | "Application-specific Availability for PoC-alerts" | basic: closed (mandatory) registration-state: active (optional) barring-state: active (optional) |
| Setting: IAB: OFF received | "Application-specific Availability for PoC-alerts" | basic: open (mandatory) registration-state: active (optional) barring-state: terminated (optional) |
| Case: Single PoC Session mode | | |
| PoC Session initiation | "Application-specific Availability for PoC-sessions" | basic: closed (mandatory) registration-state: active (optional) barring-state: terminated (optional) |
| | "Session Participation" | basic: open (mandatory) max (optional) |

TABLE 10-continued

| POC PROCEDURE | PRESENCE INFORMATION ELEMENTS | PRESENCE INFORMATION ELEMENT VALUE |
|---|---|---|
| PoC Session completion | "Application-specific Availability for PoC-sessions" | basic: open (mandatory) registration-state: active (optional) barring-state: terminated (optional) |
| | "Session Participation" | basic: closed (mandatory) |
| Case: Simultaneous PoC Session mode | | |
| PoC Session initiation AND $N_{session} < N_{max}$. | "Application-specific Availability for PoC-sessions" | basic: open (mandatory) registration-state: active (optional) barring-state: terminated (optional) |
| | "Session Participation" | basic: open (mandatory) |
| PoC Session initiation AND $N_{session} = N_{max}$. | "Application-specific Availability for PoC-sessions" | basic: closed (mandatory) registration-state: active (optional) barring-state: terminated (optional) |
| | "Session Participation" | basic: open (mandatory) max (optional) |
| PoC Session completion AND $0 < N_{session} < N_{max}$. | "Application-specific Availability for PoC-sessions" | basic: open (mandatory) registration-state: active (optional) barring-state: terminated (optional) |
| | "Session Participation" | basic: open (mandatory) |
| PoC Session completion AND $N_{session} = 0$ | "Application-specific Availability for PoC-sessions" | basic: open (mandatory) registration-state: active (optional) barring-state: terminated (optional) |
| | "Session Participation" | basic: closed (mandatory) |
| Locking in PoC Session | "Application-specific Availability for PoC-sessions" | basic: closed (mandatory) registration-state: active (optional) barring-state: terminated (optional) |
| | "Session Participation" | basic: closed (mandatory) |

As noted, the PoC server 403 can act as a presence source and publish certain sets of presence information on behalf of the PoC client 401. By way of example, the following procedures are explained: PoC registration and de-registration, and Incoming Session Barring (ISB), Incoming Instant Personal Alert Barring (IAB), and PoC Session state. These procedures can apply when the PoC server 403 acts as a presence source and supports the publication of presence information elements as specified in Table 10.

It is noted that when the SIP/IP Core 411 corresponds with 3GPP/3GPP2 IMS, the PoC server 403 can use the procedures of "AS acting as originating User Agent" defined in 3GPP TS 24.229/3GPP2 X.S0013-004-A (which is incorporated herein by reference in its entirety), when acting as a presence source.

Upon accepting a registration request from a PoC user, the PoC server 403 can act as a presence source. In such a case, the PoC server 403 can perform the publication of presence information and can set the values of the following elements (as specified in Table 10): "Availability for PoC Session Service" presence information element; and "Availability for PoC Alert Service" presence information element. In addition, the PoC server 403 can set the <entity> element of the presence information to the value of the authenticated identity of the PoC user that has registered to the PoC service (e.g., to the value of the P-Asserted-Identity header field of the REGISTER request). Further, the PoC server 403 can set the "PoC Session participation" presence information element to closed (as defined in Table 10). It is noted that other Presence information elements might be published with the appropriate values at the same time.

Upon accepting a de-registration request from a PoC user, the PoC server 403 can perform the publication of Presence information, and can set both the values of the "Availability for PoC Session Service" presence information element and the "Availability for PoC Alert Service" presence information element to unavailable. The PoC server 403 can also set the <entity> element of Presence information to the value of the authenticated identity of the PoC user that has de-registered from the PoC service (e.g., to the value of the P-Asserted-Identity header field of the REGISTER request). Further, the PoC server 403 can set the "PoC Session participation" presence information element to "closed."

Upon accepting a request from a PoC user to activate Incoming Session Barring (ISB), the PoC server 403, acting as a presence source, can set the value of "Availability for PoC Session Service" presence information element to unavailable. Additionally, the PoC server 403 can set the <entity> element of the presence information to the value of the authenticated identity of the PoC user publishing the ISB (e.g., to the value of the P-Asserted-Identity header field of the PUBLISH request).

Also, a request from a PoC user to de-activate Incoming Session Barring (ISB) triggers the PoC server 403 to perform the publication of presence information. The PoC server 403 can set the value of "Availability for PoC Session Service" presence information element to available, and the <entity> element of the presence information to the value of the authenticated identity of the PoC user publishing the ISB (e.g., to the value of the P-Asserted-Identity header field of the PUBLISH request).

Upon accepting a request from a PoC user to activate Incoming Instant Personal Alert Barring (IAB), the PoC server 403 can set the value of "Availability for PoC Alert Service" presence information element to unavailable. Also, the PoC server can set the <entity> element of presence information to the value of the authenticated identity of the PoC user publishing the IAB (e.g., to the value of the P-Asserted-Identity header field of the PUBLISH request).

In response to a request from a PoC user to de-activate Incoming Personal Alerts Barring (IAB), the PoC server 403 can set the value of "Availability for PoC Alert Service" presence information element to available. In addition, the PoC server 403 can set the <entity> element of presence information to the value of the authenticated identity of the PoC user publishing the IAB (e.g., to the value of the P-Asserted-Identity header field of the PUBLISH request).

Moreover, upon setting up or terminating a PoC Session, the PoC server 403 can act as presence source. In this case, the PoC server 403 can set the "PoC Session participation" presence information element to the appropriate value. Typically, PoC Session participation information is published when the PoC user is joining the first PoC session or tearing down the last PoC Session. Upon determining that a PoC user has reached his/her maximum number of simultaneous PoC Sessions or determining that a PoC user is no longer engaged in the maximum number of simultaneous PoC Sessions he/she can support, the PoC server 403 can act as presence source and perform publication of presence information. The PoC server 403 can set the "Availability for PoC Session Service" presence information element to the appropriate value (as specified in Table 10).

The PoC client 401 can collaborate with the presence source and watcher entities when residing in the same user equipment. When the PoC server 403 is not enabled to publish presence information on behalf of the PoC user, then the presence source residing in the same user equipment as the PoC client 401 can publish the presence information elements specified in the provisioning parameter 'PRES-SRV-CAP'.

One of ordinary skill in the art would recognize that the processes for supporting presence information may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 5.

Figure 5:
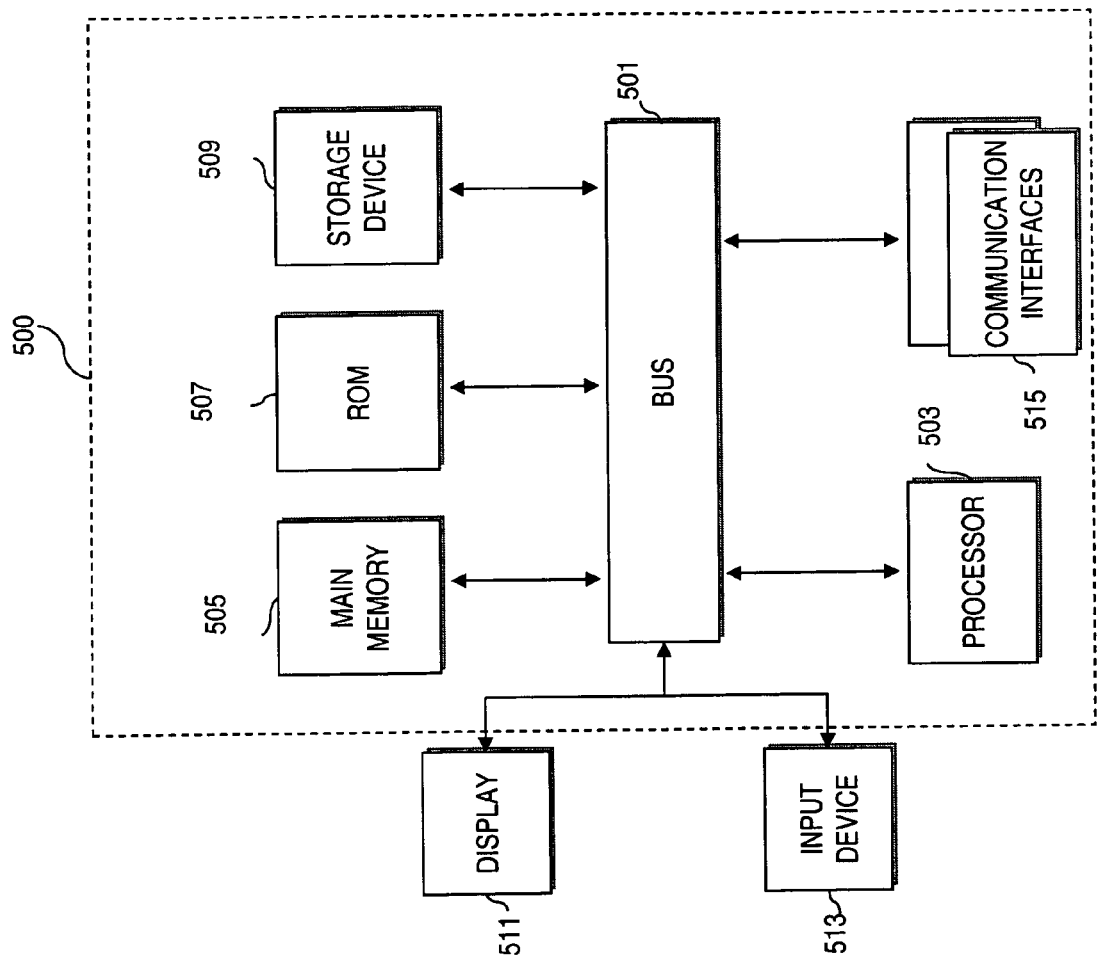
FIG. 5 is a diagram of hardware that can be used to implement various embodiments of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled via the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6A:
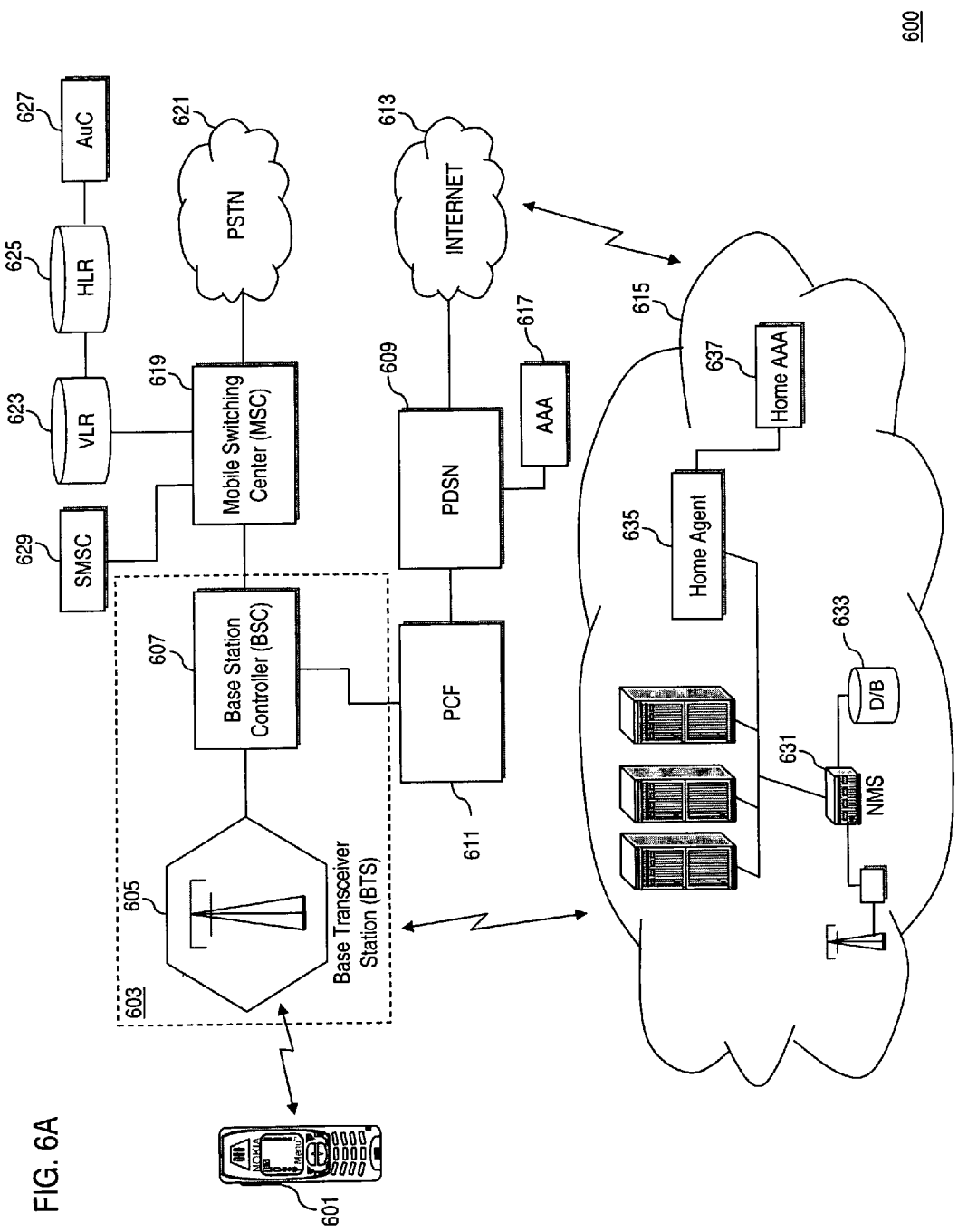
FIGS. 6A and 6B are diagrams of different cellular mobile phone systems capable of supporting various embodiments of the invention.
Figure 6B:
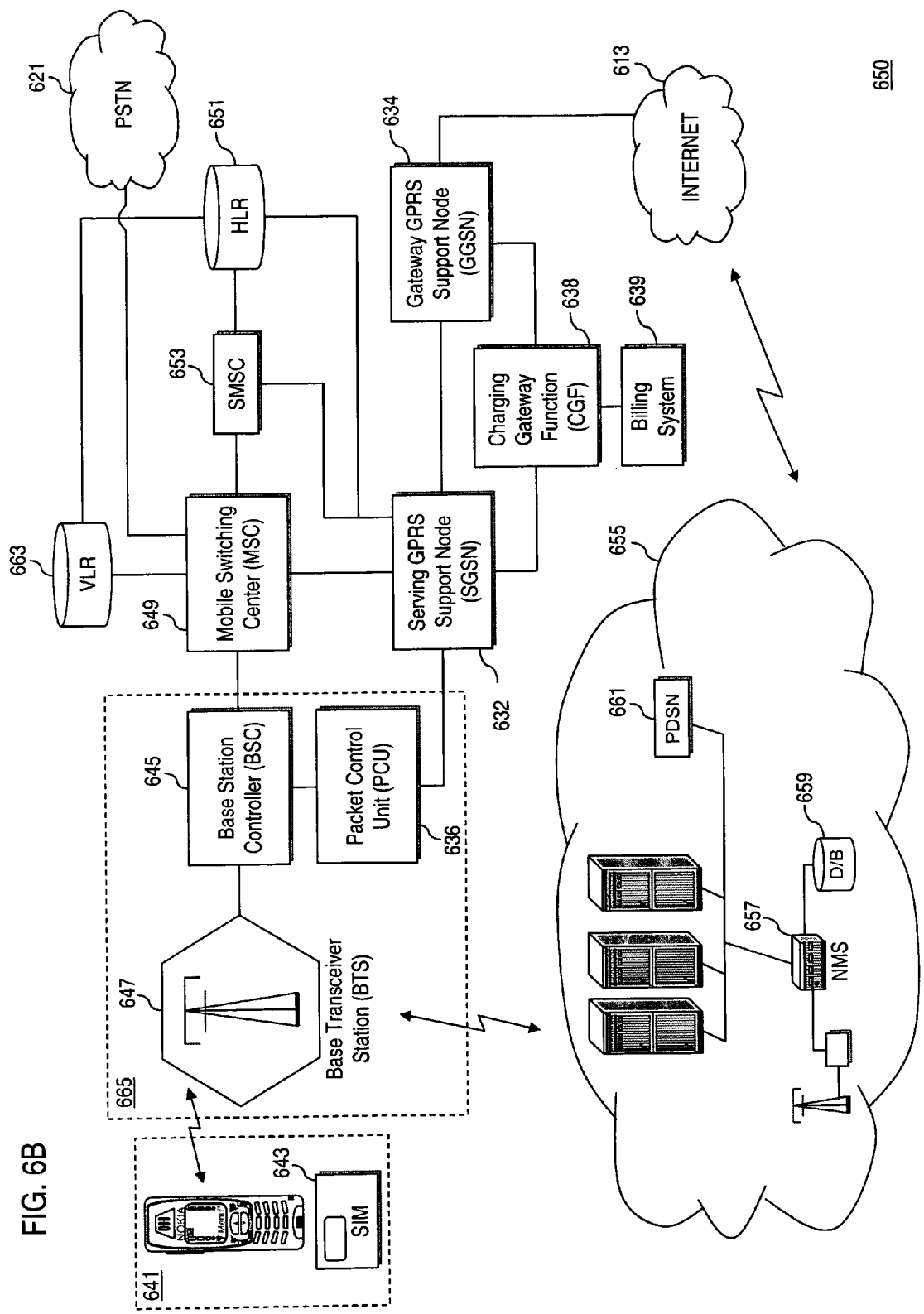

FIGS. 6A and 6B are diagrams of different cellular mobile phone systems capable of supporting various embodiments of the invention. FIGS. 6A and 6B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 600 includes mobile stations 601 (e.g., handsets, terminals, stations, units, devices, or any type of interface to the user (such as "wearable" circuitry, etc.)) in communication with a Base Station Subsystem (BSS) 603. According to one embodiment of the invention, the radio network supports Third Generation (3G) services as defined by the International Telecommunications Union (ITU) for International Mobile Telecommunications 2000 (IMT-2000).

In this example, the BSS 603 includes a Base Transceiver Station (BTS) 605 and Base Station Controller (BSC) 607. Although a single BTS is shown, it is recognized that multiple BTSs are typically connected to the BSC through, for example, point-to-point links. Each BSS 603 is linked to a Packet Data Serving Node (PDSN) 609 through a transmission control entity, or a Packet Control Function (PCF) 611. Since the PDSN 609 serves as a gateway to external networks, e.g., the Internet 613 or other private consumer networks 615, the PDSN 609 can include an Access, Authorization and Accounting system (AAA) 617 to securely determine the identity and privileges of a user and to track each user's activities. The network 615 comprises a Network Management System (NMS) 631 linked to one or more databases 633 that are accessed through a Home Agent (HA) 635 secured by a Home AAA 637.

Although a single BSS 603 is shown, it is recognized that multiple BSSs 603 are typically connected to a Mobile Switching Center (MSC) 619. The MSC 619 provides connectivity to a circuit-switched telephone network, such as the Public Switched Telephone Network (PSTN) 621. Similarly, it is also recognized that the MSC 619 may be connected to other MSCs 619 on the same network 600 and/or to other radio networks. The MSC 619 is generally collocated with a Visitor Location Register (VLR) 623 database that holds temporary information about active subscribers to that MSC 619. The data within the VLR 623 database is to a large extent a copy of the Home Location Register (HLR) 625 database, which stores detailed subscriber service subscription information. In some implementations, the HLR 625 and VLR 623 are the same physical database; however, the HLR 625 can be located at a remote location accessed through, for example, a Signaling System Number 7 (SS7) network. An Authentication Center (AuC) 627 containing subscriber-specific authentication data, such as a secret authentication key, is associated with the HLR 625 for authenticating users. Furthermore, the MSC 619 is connected to a Short Message Service Center (SMSC) 629 that stores and forwards short messages to and from the radio network 600.

During typical operation of the cellular telephone system, BTSs 605 receive and demodulate sets of reverse-link signals from sets of mobile units 601 conducting telephone calls or other communications. Each reverse-link signal received by a given BTS 605 is processed within that station. The resulting data is forwarded to the BSC 607. The BSC 607 provides call resource allocation and mobility management functionality including the orchestration of soft handoffs between BTSs 605. The BSC 607 also routes the received data to the MSC 619, which in turn provides additional routing and/or switching for interface with the PSTN 621. The MSC 619 is also responsible for call setup, call termination, management of inter-MSC handover and supplementary services, and collecting, charging and accounting information. Similarly, the radio network 600 sends forward-link messages. The PSTN 621 interfaces with the MSC 619. The MSC 619 additionally interfaces with the BSC 607, which in turn communicates with the BTSs 605, which modulate and transmit sets of forward-link signals to the sets of mobile units 601.

As shown in FIG. 6B, the two key elements of the General Packet Radio Service (GPRS) infrastructure 650 are the Serving GPRS Supporting Node (SGSN) 632 and the Gateway GPRS Support Node (GGSN) 634. In addition, the GPRS infrastructure includes a Packet Control Unit PCU (636) and a Charging Gateway Function (CGF) 638 linked to a Billing System 639. A GPRS the Mobile Station (MS) 641 employs a Subscriber Identity Module (SIM) 643.

The PCU 636 is a logical network element responsible for GPRS-related functions such as air interface access control, packet scheduling on the air interface, and packet assembly and re-assembly. Generally the PCU 636 is physically integrated with the BSC 645; however, it can be collocated with a BTS 647 or a SGSN 632. The SGSN 632 provides equivalent functions as the MSC 649 including mobility management, security, and access control functions but in the packet-switched domain. Furthermore, the SGSN 632 has connectivity with the PCU 636 through, for example, a Fame Relay-based interface using the BSS GPRS protocol (BSSGP). Although only one SGSN is shown, it is recognized that that multiple SGSNs 631 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 645, any given BSC 645 generally interfaces with one SGSN 632. Also, the SGSN 632 is optionally connected with the HLR 651 through an SS7-based interface using GPRS enhanced Mobile Application Part (MAP) or with the MSC 649 through an SS7-based interface using Signaling Connection Control Part (SCCP). The SGSN/HLR interface allows the SGSN 632 to provide location updates to the HLR 651 and to retrieve GPRS-related subscription information within the SGSN service area. The SGSN/MSC interface enables coordination between circuit-switched services and packet data services such as paging a subscriber for a voice call. Finally, the SGSN 632 interfaces with a SMSC 653 to enable short messaging functionality over the network 650.

The GGSN 634 is the gateway to external packet data networks, such as the Internet 613 or other private customer networks 655. The network 655 comprises a Network Management System (NMS) 657 linked to one or more databases 659 accessed through a PDSN 661. The GGSN 634 assigns Internet Protocol (IP) addresses and can also authenticate users acting as a Remote Authentication Dial-In User Service host. Firewalls located at the GGSN 634 also perform a firewall function to restrict unauthorized traffic. Although only one GGSN 634 is shown, it is recognized that a given SGSN 632 may interface with one or more GGSNs 633 to allow user data to be tunneled between the two entities as well as to and from the network 650. When external data networks initialize sessions over the GPRS network 650, the GGSN 634 queries the HLR 651 for the SGSN 632 currently serving a MS 641.

The BTS 647 and BSC 645 manage the radio interface, including controlling which Mobile Station (MS) 641 has access to the radio channel at what time. These elements essentially relay messages between the MS 641 and SGSN 632. The SGSN 632 manages communications with an MS 641, sending and receiving data and keeping track of its location. The SGSN 632 also registers the MS 641, authenticates the MS 641, and encrypts data sent to the MS 641.

Figure 7:
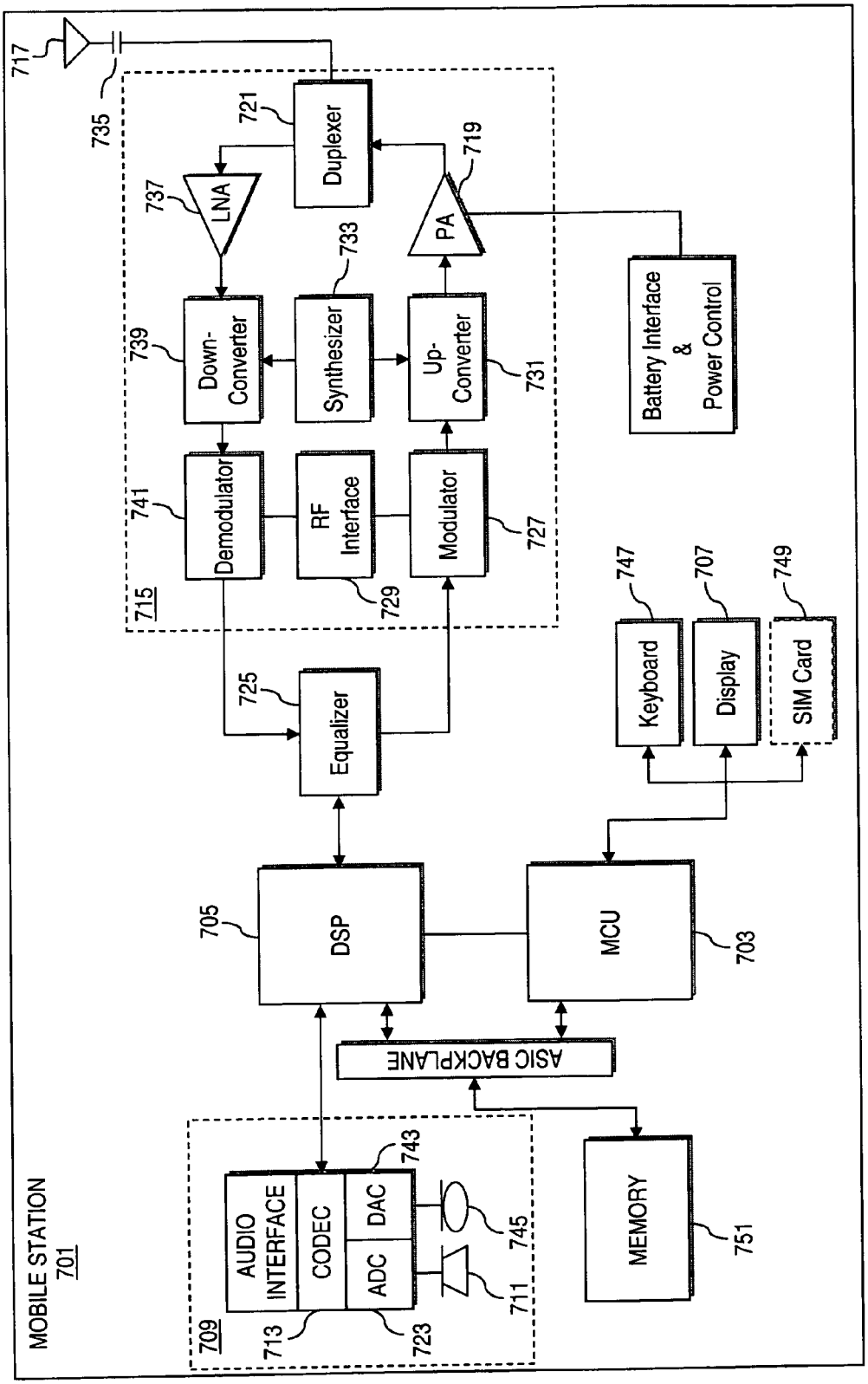
FIG. 7 is a diagram of exemplary components of a mobile station capable of operating in the systems of FIGS. 6A and 6B, according to an embodiment of the invention.

FIG. 7 is a diagram of exemplary components of a mobile station (e.g., handset) capable of operating in the systems of FIGS. 6A and 6B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system (e.g., systems of FIG. 6A or 6B), via antenna 717. The power amplifier (PA) 719 and the transmitter/modulation circuitry are operationally responsive to the MCU 703, with an output from the PA 719 coupled to the duplexer 721 or circulator or antenna switch, as known in the art.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 1005. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The MCU 703 delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

Figure 8:
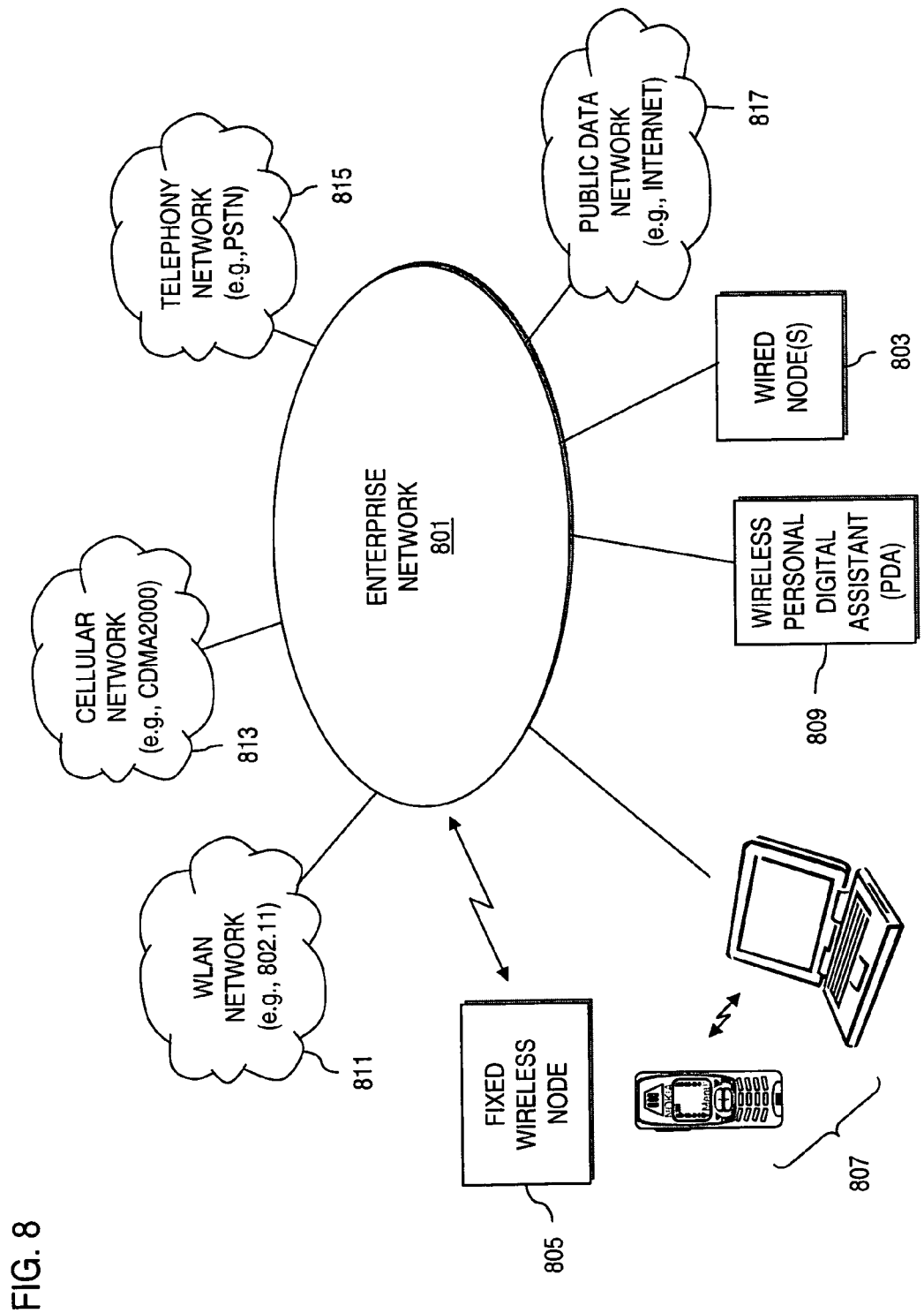
FIG. 8 is a diagram of an enterprise network capable of supporting the processes described herein, according to an embodiment of the invention.

FIG. 8 shows an exemplary enterprise network, which can be any type of data communication network utilizing packet-based and/or cell-based technologies (e.g., Asynchronous Transfer Mode (ATM), Ethernet, IP-based, etc.). The enterprise network 801 provides connectivity for wired nodes 803 as well as wireless nodes 805-809 (fixed or mobile), which are each configured to perform the processes described above. The enterprise network 801 can communicate with a variety of other networks, such as a WLAN network 811 (e.g., IEEE 802.11), a cdma2000 cellular network 813, a telephony network 815 (e.g., PSTN), or a public data network 817 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining an event affecting availability of a terminal over a radio communication network, wherein the terminal is configured to utilize a group Push-to-Talk communication service supported by the radio communication network;
    checking setting of an incoming session barring indicator corresponding to the terminal, wherein the incoming session barring indicator specifies that the terminal is configured to not accept incoming group Push-to-Talk communication sessions;
    generating presence information based on the setting of the incoming session barring indicator and the event, wherein the presence information is used to determine the availability of the terminal for the group Push-to-Talk communication service; and
    generating a message including the presence information regarding the availability of the terminal;
    the method further comprising:
    checking a setting of an instant personal alert barring indicator corresponding to the terminal; and
    generating the presence information further based on the setting of the instant personal alert barring indicator, where the setting of the instant personal alert barring indicator determines whether to accept or not accept an instant personal alert.

2. A method according to claim 1, further comprising:
    causing, at least in part, the message to be transmitted to a presence server configured to distribute the presence information, wherein the message has a format according to a Presence Information Data Format.

3. A method according to claim 1, further comprising:
    causing, at least in part, an event attribute associated with the event to be received according to a subscription, the event attribute being configured to specify one of a registered state, a refreshed state, an expired state, or a rejected state corresponding to registration of the terminal within the radio communication network, wherein the registration is based on a Session Initiation Protocol (SIP); and
    mapping the event attribute to the presence information.

4. A method according to claim 1, further comprising:
    determining whether the terminal is available based on a criterion, wherein the criterion includes configuration of the terminal or being within a coverage area of the radio communication network.

5. A method according to claim 1, wherein the presence information is further generated based on whether the terminal is engaged in a maximum number of allowed concurrent group Push-to-Talk communication sessions.

6. A method according to claim 1, further comprising:
    checking setting of simultaneous group Push-to-Talk communication sessions support; and
    generating the presence information further based on the setting of the simultaneous group Push-to-Talk communication sessions support.

7. A method according to claim 1, wherein the group Push-to-Talk communication service is a Push-to-Talk over Cellular (PoC) group Push-to-Talk communication service.

8. A method according to claim 1, further comprising:
    generating, directly, an event attribute for the event; and
    causing, at least in part, the event attribute to be published as the presence information.

9. An apparatus comprising:
    at least one processor; and at least one memory including computer program code, the at least one memory and the computer program code being configured, with the at least one processor, to cause the apparatus at least to,
    determine an event affecting availability of a terminal over a radio communication network, wherein the terminal is configured to utilize a group Push-to-Talk communication service supported by the radio communication network,
    check setting of an incoming session barring indicator corresponding to the terminal, wherein the incoming session barring indicator specifies that the terminal is configured to not accept incoming group Push-to-Talk communication sessions,
    generate presence information based on the setting of the incoming session barring indicator and the event, wherein the presence information is used to determine the availability of the terminal for the group Push-to-Talk communication service, and generate a message including the presence information regarding the availability of the terminal;

where the computer program code is further configured, with the at least one processor, to check a setting of an instant personal alert barring indicator corresponding to the terminal; and to generate the presence information further based on the setting of the instant personal alert barring indicator, where the setting of the instant personal alert barring indicator determines whether to accept or not accept an instant personal alert.

10. An apparatus according to claim 9, wherein the apparatus is at least further caused to:

transmit the message to a presence server that is configured to distribute the presence information, wherein the message has a format according to a Presence Information Data Format.

11. A system comprising the apparatus of claim 10 and the presence server.

12. An apparatus according to claim 9, wherein the apparatus is at least further caused to:

receive an event attribute associated with the event according to a subscription, the event attribute being configured to specify one of a registered state, a refreshed state, an expired state, or a rejected state corresponding to registration of the terminal within the communication network, wherein the registration is based on a Session Initiation Protocol (SIP); and map the event attribute to the presence information.

13. An apparatus according to claim 9, wherein the apparatus is at least further caused to:

determine whether the terminal is available based on a criterion, wherein the criterion includes configuration of the terminal or being within a coverage area of the radio communication network.

14. An apparatus according to claim 9, wherein the apparatus is at least further caused to:

generate the presence information further based on whether the terminal is engaged in a maximum number of allowed concurrent group Push-to-Talk communication sessions.

15. An apparatus according to claim 9, wherein the apparatus is at least further caused to:

check setting of simultaneous group Push-to-Talk communication sessions support; and generate the presence information further based on the setting of the simultaneous group Push-to-Talk communication sessions support.

16. An apparatus according to claim 9, wherein the group Push-to-Talk communication service is a Push-to-Talk over Cellular (PoC) group Push-to-Talk communication service.

17. An apparatus according to claim 9, wherein the apparatus is at least further caused to:

generate, directly, an event attribute for the event, wherein the event attribute is to be published as the presence information.

18. An apparatus according to claim 9, further comprising: means for directly generating an event attribute for the event, the event attribute being published as the presence information.

19. A method comprising:

causing, at least in part, registration with a communication network that includes a radio network to communicate over the communication network, wherein an event associated with the registration is used to determine availability for a communication service that includes a group Push-to-Talk communication service supported by the communication network; and causing, at least in part, an incoming session barring indicator to be set to indicate non-acceptance of group Push-to-Talk communication sessions, wherein an application server generates a message including presence information relating to the group Push-to-Talk communication service, the presence information having been generated based on the event and the setting of the incoming session barring indicator;

the method further comprising:

causing, at least in part, an instant personal alert barring indicator to be set to specify barring of an instant personal alert, where the presence information has been further generated based on the setting of the instant personal alert barring indicator, where the setting of the instant personal alert barring indicator determines whether to accept or not accept an instant personal alert.

20. A method according to claim 19, wherein the message is caused to be transmitted to a presence server configured to distribute the presence information, wherein the message has a format according to a Presence Information Data Format.

21. A method according to claim 19, wherein the event corresponds to one of a registered state, a refreshed state, an expired state, or a rejected state of the registration, the registration being based on a Session Initiation Protocol (SIP).

22. A method according to claim 19, wherein the availability is based on a criterion that includes configuration information for operating within the radio network or being within coverage area of the radio network.

23. A method according to claim 19, wherein the presence information has been further generated based on engagement in a maximum number of allowed concurrent communication sessions.

24. A method according to claim 19, further comprising:

causing, at least in part, a simultaneous group Push-to-Talk communication sessions indicator to be set, wherein the presence information has been further generated based on the setting of the simultaneous group Push-to-Talk communication sessions indicator.

25. A method according to claim 19, wherein the group Push-to-Talk communication service is a Push-to-Talk over Cellular (PoC) group Push-to-Talk group communication service.

26. A method according to claim 19, wherein the application server is configured to directly generate an event attribute for the event and to publish the event attribute as the presence information.

27. An apparatus comprising:

at least one processor; and at least one memory including computer program code, the at least one memory and the computer program code being configured, with the at least one processor, to cause the apparatus at least to:

initiate registration with a communication network that includes a radio network to communicate over the communication network, wherein an event associated with the registration is used to determine availability for a communication service that includes a group Push-to-Talk communication service supported by the communication network, and initiate setting of an incoming session barring indicator to indicate non-acceptance of group Push-to-Talk communication sessions, wherein an application server generates a message including presence information relating to the group Push-to-Talk communication service, the presence information having been generated based on the event and the setting of the incoming session barring indicator;

wherein the apparatus is at least further caused to:

initiate setting of an instant personal alert barring indicator to specify barring of an instant personal alert, wherein the presence information has been further generated based on the setting of the instant personal alert barring indicator, where the setting of the instant personal alert barring indicator determines whether to accept or not accept an instant personal alert.

28. An apparatus according to claim 27, wherein the message is caused to be transmitted to a presence server configured to distribute the presence information, wherein the message has a format according to a Presence Information Data Format.

29. An apparatus according to claim 27, wherein the event corresponds to one of a registered state, a refreshed state, an expired state, or a rejected state of the registration, the registration being based on a Session Initiation Protocol (SIP).

30. An apparatus according to claim 27, wherein the apparatus is at least further caused to:

output an audio signal corresponding to group Push-to-Talk communication service traffic.

31. An apparatus according to claim 27, wherein the availability is based on a criterion that includes configuration information for operating within the radio network or being within coverage area of the radio network.

32. An apparatus according to claim 27, wherein the presence information has been further generated based on engagement in a maximum number of allowed concurrent communication sessions.

33. An apparatus according to claim 27, wherein the apparatus is at least further caused to:

check setting of simultaneous group Push-To-Talk communication sessions support, wherein the presence information has been further generated based on the setting of the simultaneous group Push-to-Talk communication sessions support.

34. An apparatus according to claim 27, wherein the group Push-to-Talk communication service is a Push-to-Talk over Cellular (PoC) group Push-to-Talk communication service.

35. An apparatus according to claim 27, wherein the application server is configured to directly generate an event attribute for the event and to publish the event attribute as the presence information.

36. An apparatus according to claim 27, wherein the apparatus is at least further caused to:

generate, directly, an event attribute for the event, wherein the event attribute is published as the presence information.

\* \* \* \* \*